US012720307B2

(12) United States Patent
Ullah et al.

(10) Patent No.: US 12,720,307 B2
(45) Date of Patent: Aug. 25, 2026

(54) AUTHENTICATION OF SUBSCRIBER ENTITIES TO ENTERPRISE NETWORKS

(71) Applicant: Telefonaktiebolaget LM Ericsson (publ), Stockholm (SE)

(72) Inventors: Kazi Wali Ullah, Espoo (FI); Patrik Teppo, Bobäck (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 141 days.

(21) Appl. No.: 18/286,668

(22) PCT Filed: Apr. 15, 2021

(86) PCT No.: PCT/EP2021/059834
§ 371 (c)(1),
(2) Date: Oct. 12, 2023

(87) PCT Pub. No.: WO2022/218534
PCT Pub. Date: Oct. 20, 2022

(65) Prior Publication Data
US 2024/0196211 A1 Jun. 13, 2024

(51) Int. Cl.
*H04W 12/06* (2021.01)
*H04W 12/08* (2021.01)

(52) U.S. Cl.
CPC ........... *H04W 12/06* (2013.01); *H04W 12/08* (2013.01)

(58) Field of Classification Search
CPC ....... H04W 12/06; H04W 12/08; H04W 8/18; H04L 63/0281
See application file for complete search history.

(56) References Cited

U.S. PATENT DOCUMENTS

2011/0013776 A1* 1/2011 McAlister ............. H04L 63/164 380/283
2016/0182488 A1* 6/2016 Mowers .................. H04L 67/01 726/4

(Continued)

FOREIGN PATENT DOCUMENTS

EP 3713274 A1 9/2020
WO WO-2022033491 A1 * 2/2022

OTHER PUBLICATIONS

Rose, S., et al., "Zero Trust Architecture", National Institute of Standards and Technology, NIST Special Publication 800-207, Aug. 1, 2020, pp. 1-59.

(Continued)

*Primary Examiner* — Alexander Lagor
*Assistant Examiner* — Lydia L Noel
(74) *Attorney, Agent, or Firm* — COATS & BENNETT, PLLC

(57) ABSTRACT

A method is performed by a ZTNA controller. The method comprises obtaining an indication that the subscriber entity requests to access the application service of the enterprise network. The indication is obtained via an access network to which the subscriber entity is operatively connected. The method comprises providing a request for user information of the subscriber entity to a UDM entity provided in a core network to which the access network is operatively connected. The request for user information comprises an identifier of the subscriber entity. The method comprises obtaining the user information of the subscriber entity from the UDM entity. The user information indicates successful 3GPP credentials based authentication of the subscriber entity performed by the UDM entity. The method comprises granting access for the subscriber entity to the application (Continued)

service of the enterprise network only when a policy associated to the user information allows so.

20 Claims, 5 Drawing Sheets

(56) References Cited

U.S. PATENT DOCUMENTS

| | | | | |
|---|---|---|---|---|
| 2020/0344576 | A1* | 10/2020 | Li | H04W 4/06 |
| 2021/0092605 | A1* | 3/2021 | Draznin | H04W 8/26 |
| 2022/0287151 | A1* | 9/2022 | Howe | H04W 8/18 |
| 2023/0164727 | A1* | 5/2023 | Wei | H04W 60/04 455/435.1 |

OTHER PUBLICATIONS

Infoblox, "What is Gartner Sase?", Learn about Secure Access Service Edge, Retrieved from the internet: URL: https://www.infoblox.com/glossary/gartner-sase/, [retrieved on Sep. 26, 2023], pp. 1-6.

* cited by examiner

AUTHENTICATION OF SUBSCRIBER ENTITIES TO ENTERPRISE NETWORKS

TECHNICAL FIELD

Embodiments presented herein relate to a method, a Zero-Trust Network Access (ZTNA) controller, a computer program, and a computer program product for controlling access of a subscriber entity to an application service of an enterprise network. Embodiments presented herein further relate to a method, a User Data Management (UDM) entity, a computer program, and a computer program product for authenticating a subscriber entity.

BACKGROUND

Traditionally, network security is built based on network perimeter protection. When a subscriber has access to network services, applications, and data within the network perimeter, the subscriber could access all network services, applications, and data within the network perimeter. This paradigm is changing and subscribers may need to be authenticated or authorized every time when access is to be made to the network services, applications, and data within the network perimeter. This is commonly known as Zero-Trust Architecture (ZTA) or as Zero-Trust Network Access (ZTNA). ZTA can be implemented for network services, applications, and data being either provided in an enterprise network either on-premise or in external computational clouds.

One main concept behind the zero trust is that subscribers should not be trusted by default, even if they are connected to a managed enterprise network such as a corporate Local Area Network (LAN) and even if they were previously verified. The zero trust approach advocates mutual authentication, including checking the identity and integrity of the subscriber, irrespective of the location of the subscriber, and providing access to network services, applications, and data based on the confidence of subscriber identity and subscriber health in combination with user authentication. ZTNA is based on application level identities of the subscribers and thus requires authentication at the application layer.

In this respect, Secure Access Service Edge (SASE) can be regarded as a new architectural model for enterprise networking and network security, defined as a means of supporting fast and secure application access needs. In some aspects, SASE capabilities are considered as being delivered as a service based upon the identity of the subscribers, real-time context, enterprise security/compliance policies and continuous assessment of risk/trust throughout sessions. Identities of subscribers can be associated with people, groups of people (branch offices), devices, applications, services, Internet-of-Things (IoT) systems or edge computing locations.

In order to connect to the enterprise network the subscribers may need to perform additional authentication at the connectivity, or network, layer. This is for example the case where the subscribers wish to access the enterprise network via an access network and where the subscribers have a wireless connection to the access network. However, although authentication first is performed at the connectivity, or network, layer for the subscriber to establish the wireless connection to the access network, all information (such as connectivity, or network, layer identity information of the subscriber) exchanged on the connectivity, or network, layer is invisible to the ZTNA and hence cannot be used for authentication at the application layer.

This implies that two independent authentication procedures need to be performed for the subscriber each time the subscriber needs to access the enterprise network. As such, this consumes network resources in terms of overhead signalling, requires processing power and processing utilization, and also results in a delay before the subscriber can access the enterprise network.

Hence, there is a need for improved authentication procedures for subscribers to access an enterprise network.

SUMMARY

An object of embodiments herein is to address the above issues by providing techniques for controlling access of a subscriber entity to an application service of an enterprise network.

According to a first aspect there is presented a method for controlling access of a subscriber entity to an application service of an enterprise network. The method is performed by a ZTNA controller. The method comprises obtaining an indication that the subscriber entity requests to access the application service of the enterprise network. The indication is obtained via an access network to which the subscriber entity is operatively connected. The method comprises providing a request for user information of the subscriber entity to a UDM entity provided in a core network to which the access network is operatively connected. The request for user information comprises an identifier of the subscriber entity. The method comprises obtaining the user information of the subscriber entity from the UDM entity. The user information indicates successful 3GPP credentials based authentication of the subscriber entity performed by the UDM entity. The method comprises granting access for the subscriber entity to the application service of the enterprise network only when a policy associated to the user information allows so.

According to a second aspect there is presented a ZTNA controller for controlling access of a subscriber entity to an application service of an enterprise network. The ZTNA controller comprises processing circuitry. The processing circuitry is configured to cause the ZTNA controller to obtain an indication that the subscriber entity requests to access the application service of the enterprise network. The indication is obtained via an access network to which the subscriber entity is operatively connected. The processing circuitry is configured to cause the ZTNA controller to provide a request for user information of the subscriber entity to a UDM entity provided in a core network to which the access network is operatively connected. The request for user information comprises an identifier of the subscriber entity. The processing circuitry is configured to cause the ZTNA controller to obtain the user information of the subscriber entity from the UDM entity. The user information indicates successful 3GPP credentials based authentication of the subscriber entity performed by the UDM entity. The processing circuitry is configured to cause the ZTNA controller to grant access for the subscriber entity to the application service of the enterprise network only when a policy associated to the user information allows so.

According to a third aspect there is presented a ZTNA controller for controlling access of a subscriber entity to an application service of an enterprise network. The ZTNA controller comprises an obtain module configured to obtain an indication that the subscriber entity requests to access the application service of the enterprise network. The indication is obtained via an access network to which the subscriber entity is operatively connected. The ZTNA controller comprises a provide module configured to provide a request for user information of the subscriber entity to a UDM entity provided in a core network to which the access network is operatively connected. The request for user information comprises an identifier of the subscriber entity. The ZTNA controller comprises an obtain module configured to obtain the user information of the subscriber entity from the UDM entity. The user information indicates successful 3GPP credentials based authentication of the subscriber entity performed by the UDM entity. The ZTNA controller comprises a grant module configured to grant access for the subscriber entity to the application service of the enterprise network only when a policy associated to the user information allows so.

According to a fourth aspect there is presented a computer program for controlling access of a subscriber entity to an application service of an enterprise network, the computer program comprising computer program code which, when run on processing circuitry of a ZTNA controller, causes the ZTNA controller to perform a method according to the first aspect.

According to a fifth aspect there is presented a method for authenticating a subscriber entity. The method is performed by a UDM entity of a core network. The method comprises participating in 3GPP credentials based authentication of the subscriber entity to an access network to which the core network is operatively connected. The method comprises obtaining a request for user information of the subscriber entity from a ZTNA controller. The request for user information comprises an identifier of the subscriber entity. The method comprises providing the user information of the subscriber entity to the ZTNA controller. The user information indicates successful 3GPP credentials based authentication of the subscriber entity.

According to a sixth aspect there is presented a UDM entity of a core network for authenticating a subscriber entity. The UDM entity comprises processing circuitry. The processing circuitry is configured to cause the UDM entity to participate in 3GPP credentials based authentication of the subscriber entity to an access network to which the core network is operatively connected. The processing circuitry is configured to cause the UDM entity to obtain a request for user information of the subscriber entity from a ZTNA controller. The request for user information comprises an identifier of the subscriber entity. The processing circuitry is configured to cause the UDM entity to provide the user information of the subscriber entity to the ZTNA controller. The user information indicates successful 3GPP credentials based authentication of the subscriber entity.

According to a seventh aspect there is presented a UDM entity of a core network for authenticating a subscriber entity. The UDM entity comprises a participate module configured to participate in 3GPP credentials based authentication of the subscriber entity to an access network to which the core network is operatively connected. The UDM entity comprises an obtain module configured to obtain a request for user information of the subscriber entity from a ZTNA controller. The request for user information comprises an identifier of the subscriber entity. The UDM entity comprises a provide module configured to provide the user information of the subscriber entity to the ZTNA controller. The user information indicates successful 3GPP credentials based authentication of the subscriber entity.

According to an eighth aspect there is presented a computer program for authenticating a subscriber entity, the computer program comprising computer program code which, when run on processing circuitry of a UDM entity, causes the UDM entity to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these aspects enable the subscriber entity to the authenticated to an enterprise network based on 3GPP credentials only and without requiring enterprise network-specific credentials. In turn, this implies that only one identifier per subscriber need to be managed.

Advantageously, these aspects are applicable regardless of the type of device in which the subscriber entity is provided, as long as the subscriber entity has access to, or is provided with, 3GPP credentials.

Advantageously, these aspects are applicable regardless of the type of network access the subscriber entity has, as long as the ZTNA controller is operatively connected between the subscriber entity and the enterprise network.

Advantageously, these aspects are combinable with additional information for deciding whether or not the subscriber entity is to be granted access to the enterprise network.

Advantageously, these aspects are applicable for different deployments of the ZTNA controller; the ZTNA controller does not need to be collocated with the enterprise network, as long as the ZTNA controller is operatively connected between the subscriber entity and the enterprise network.

Advantageously, these aspects do not require dedicated hardware and/or software to be provided in the subscriber entity or the enterprise network.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
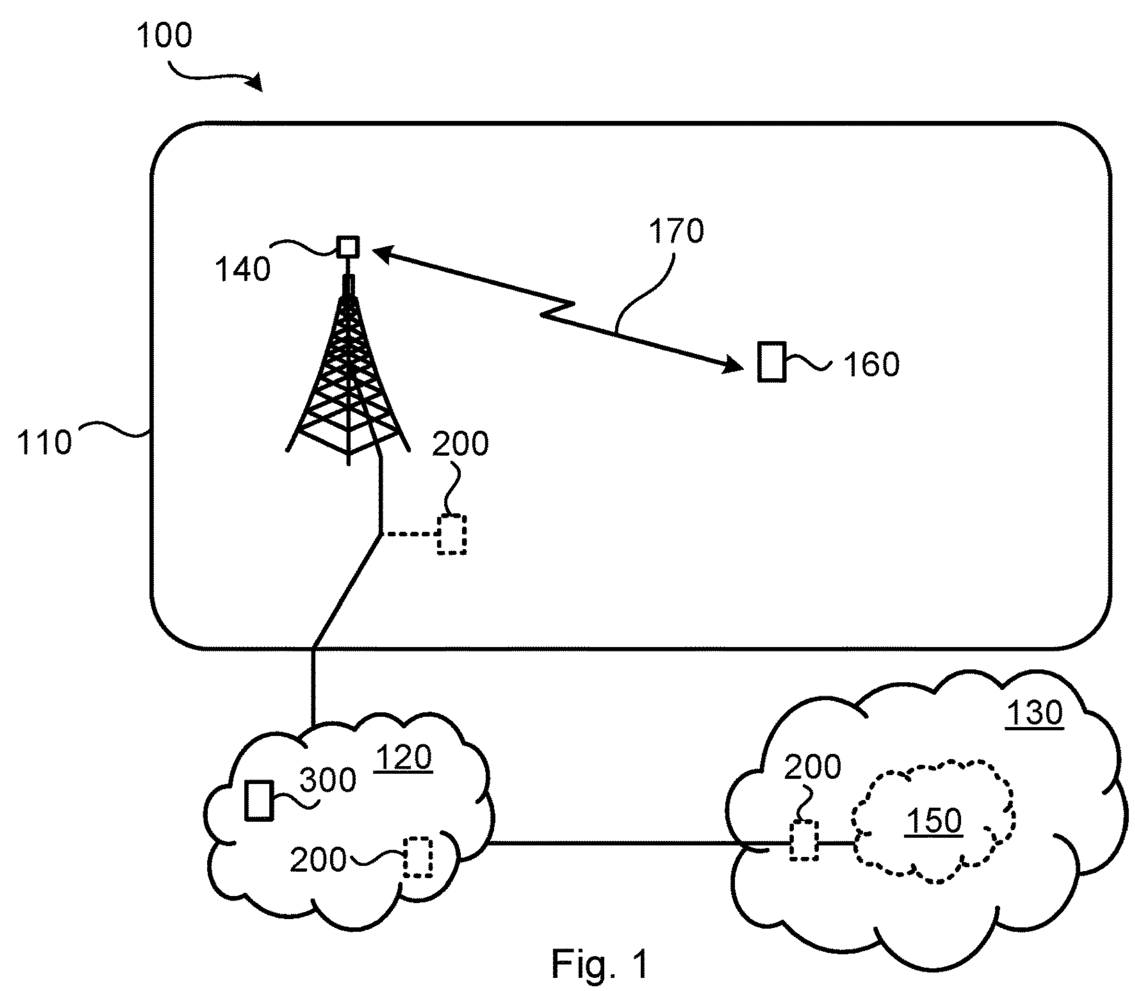
FIGS. 1, 4, 5, and 6 are schematic diagrams illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a network node 140 configured to provide network access to users, as represented by a subscriber entity 160, in a radio access network 110 over a wireless link 170. The radio access network 110 is operatively connected to a core network 120. The core network 120 is in turn operatively connected to a service network 130, such as the Internet. The subscriber entity 160 is thereby enabled to, via the network node 140, access services of, and exchange data with, the service network 130. In turn, an enterprise network 150 is deployed in the service network 130 and/or within coverage of the radio access network 110. Authentication to the enterprise network 150 is controlled by a ZTNA controller 200. As will be further disclosed below, the ZTNA controller 200 is configured to interact with a UDM entity 300 provided in the core network 120. The ZTNA controller 200 might be provided in any of the access network 110, the core network 120, and the enterprise network 150.

The network node 140 comprises, is collocated with, is integrated with, or is in operational communications with, a transmission and reception point (TRP). Examples of network nodes 140 are radio access network nodes, radio base stations, base transceiver stations, Node Bs, evolved Node Bs, gNBs, access points, access nodes, and backhaul nodes. Examples of subscriber entities 160 are end-user devices, such as user equipment, wireless devices, mobile stations, mobile phones, handsets, wireless local loop phones, smartphones, laptop computers, tablet computers, as well as network routers, network equipped sensors, network equipped vehicles, and IoT devices. In some examples the access network 110 is a 5G access network 110, and the core network 120 is a 5G core network 120.

As noted above, there is a need for improved authentication procedures for subscriber entities 160 to access an enterprise network 150.

As further disclosed above, this is due to that all information (such as connectivity, or network, layer identity information of the subscriber entities 160) exchanged on the connectivity, or network, layer is invisible to the ZTNA and hence cannot be used for authentication at the application layer. This implies that, for example identifiers of the subscriber entities 160 as used for authentication at the connectivity, or network layer are invisible to the authentication at the application layer.

In this respect, at least two different sets of identifiers need to be maintained by an organization. One set of identifiers (e.g. 3GPP credentials) for the subscriber entities 160 for authentication at the connectivity, or network, layer and one set of identifiers (e.g. client IDs) for authentication at the application layer. Maintaining two sets of identifiers requires more storage space than for maintaining only one set of identifiers and is also more challenging in some cases as both sets of identifiers have to be protected at the same time. Furthermore, a trusted client application (also known as an agent) might be needed at each subscriber entity for secure processing of the application level identifier. This requires extra hardware and/or software to be installed in the subscriber entity 160. In some cases this can be problematic due to constraints, such as limited processing power in the subscriber entity 160 (which prohibits the running of extra software), limited size of the subscriber entity 160 (which prohibits extra hardware), etc. Further, a vendor of the subscriber entity 160 might not allow software not provided by the vendor to be run on a device where the subscriber entity 160 is implemented.

The embodiments disclosed herein therefore relate to mechanisms for controlling access of a subscriber entity 160 to an application service of an enterprise network 150 and authenticating a subscriber entity 160. In order to obtain such mechanisms there is provided a ZTNA controller 200, a method performed by the ZTNA controller 200, a computer program product comprising code, for example in the form of a computer program, that when run on processing circuitry of the ZTNA controller 200, causes the ZTNA controller 200 to perform the method. In order to obtain such mechanisms there is further provided a UDM entity 300, a method performed by the UDM entity 300, and a computer program product comprising code, for example in the form of a computer program, that when run on processing circuitry of the UDM entity 300, causes the UDM entity 300 to perform the method.

The inventors of the herein disclosed embodiments have realized that leveraging only one set of identifiers for both connectivity and enterprise network access would be of benefit.

The inventors of the herein disclosed embodiments have further realized that some types of identifiers, such as 3GPP credentials, could also be suitable for authentication at the application layer. In this respect, the UDM supports user identification handling (e.g. storage and management of identifiers for each subscriber entity). In order to provide its functionality, the UDM uses subscription data (including authentication data) that may be stored in a unified data repository (UDR), in which case a UDM implements the application logic and does not require an internal user data storage and then several different UDMs may serve the same user in different transactions.

Figure 2:
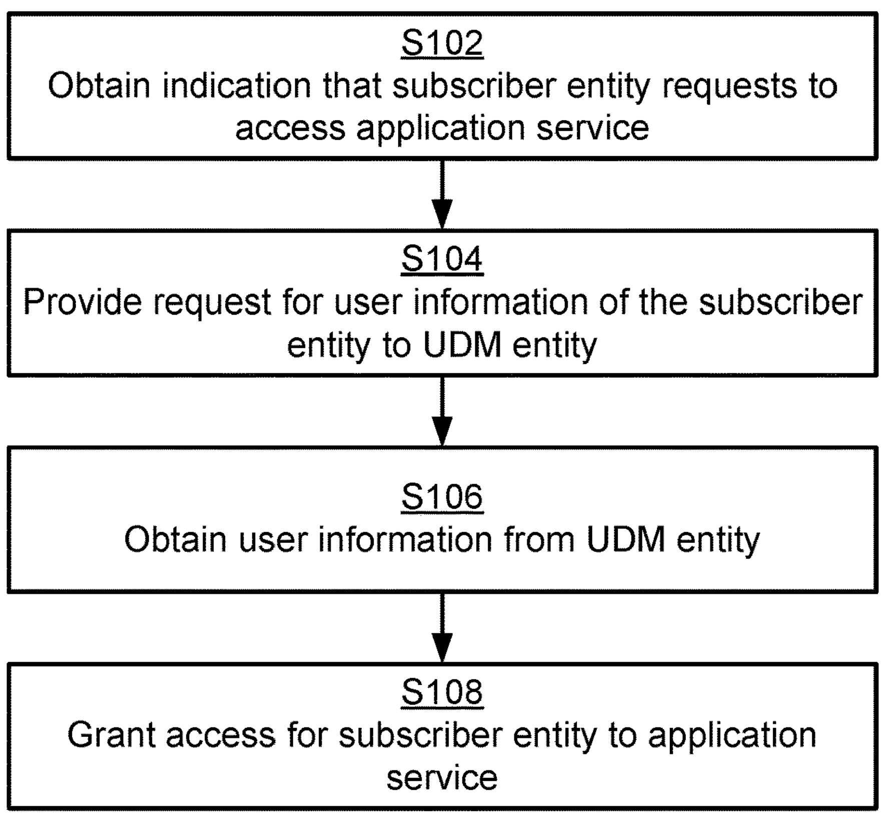
FIGS. 2 and 3 are flowcharts of methods according to embodiments.

According to at least some of the herein disclosed embodiments, 3GPP credentials are used in the process of authenticating a subscriber entity to an enterprise network. At its core, 3GPP credentials and UDM are used for identification as a replacement for application level identifiers in a traditional ZTNA based enterprise network. Reference is now made to FIG. 2 illustrating a method for controlling access of a subscriber entity 160 to an application service of an enterprise network 150 as performed by the ZTNA controller 200 according to an embodiment.

S102: The ZTNA controller 200 obtains an indication that the subscriber entity 160 requests to access the application service of the enterprise network 150. The indication is obtained via an access network 110 to which the subscriber entity 160 is operatively connected.

It is here noted that the indication might be provided via the access network 110 from the core network 120 or from another entity in the access network 110, depending on the scenario.

S104: The ZTNA controller 200 provides a request for user information of the subscriber entity 160 to a UDM entity 300 provided in a core network 120 to which the access network 110 is operatively connected. The request for user information comprises an identifier of the subscriber entity 160.

S106: The ZTNA controller 200 obtains the user information of the subscriber entity 160 from the UDM entity 300. The user information indicates successful 3GPP credentials based authentication of the subscriber entity 160 performed by the UDM entity 300.

S108: The ZTNA controller 200 grants access for the subscriber entity 160 to the application service of the enterprise network 150 only when a policy associated to the user information allows so.

Embodiments relating to further details of controlling access of a subscriber entity 160 to an application service of an enterprise network 150 as performed by the ZTNA controller 200 will now be disclosed.

There could be different identifiers of the subscriber entity 160 that the ZTNA controller 200 provides in the request for user information. In some embodiments, the identifier of the subscriber entity 160 is an Internet Protocol (IP) address.

There may be different kinds of policies. In some embodiments, the policy defines interactions allowed to be performed by the subscriber entity 160 with the enterprise network 150. These interactions might pertain to what services, what applications, what parts of the enterprise network 150, and/or what data in the enterprise network 150 the subscriber entity 160 is allowed to access, utilize, or manipulate.

In some aspects, whether to grant access for the subscriber entity 160 to the application service of the enterprise network 150 or not depends also on other properties, factors, or characteristics that the ZTNA controller 200 obtains, or otherwise has access to. In this respect, in some aspects, further information in addition to the user information is necessary for the ZTNA controller 200 to be able to apply a user specific policy. One option to ensuring that only a legitimate user is using an authorized subscriber entity 160 is to apply a device login mechanism. In one example the subscriber entity 160 has valid 3GPP credentials that are allocated to a particular user. The user must then be logged in to that subscriber entity 160 using his/her own credentials (e.g., a password, a one-time password, biometrics data such as a fingerprint or a retina scan, etc.) in order for the subscriber entity 160 to be granted access to the enterprise network 150. In this way it can be guaranteed that the policy is applied on a user level and not on a per subscription level. Also, this ensures that the subscriber entity 160 is not misused by anyone that is not authorized to have access to the enterprise network 150. The ZTNA controller 200 might thus obtain further information such as location data, authentication/local policy, role, network connection information, etc. for this purpose. In particular, in some embodiments, granting access for the subscriber entity 160 to the application service of the enterprise network 150 additionally is based on at least one parameter value pertaining to any of: location of the subscriber entity 160, role of the subscriber entity 160 in the enterprise network 150, type of network connection for the subscriber entity 160, device related information of the subscriber entity 160 (such as e.g. device unique identifier, International Mobile Equipment Identity (IMEI), Equipment Serial Number (ESN), etc.). Such further information might be obtained from the UDM entity 300. That is, in some embodiments, at least one of the at least one parameter value is obtained in the user information from the UDM entity 300. Such further information might additionally or alternatively be obtained from other entities. That is, in some embodiments, at least one of the at least one parameter value is obtained from any of: the subscriber entity 160, the enterprise network 150, information stored locally in the ZTNA controller 200.

Further, whether to grant access for the subscriber entity 160 to the application service of the enterprise network 150 or not might depend on still further information. For example, access might additionally only be granted if the subscriber entity 160 is at an allowed location, has a particular type of network connection, etc. That is, in some embodiments, access for the subscriber entity 160 to the application service of the enterprise network 150 additionally only is granted when the at least one parameter value fulfils an access-limiting requirement for the application service. On example of the access-limiting requirement is that the subscriber entity needs to be located at a prescribed location in order to be granted access to the application service of the enterprise network 150. Another example of the access-limiting requirement is that the subscriber entity 160 needs to have a certain type of network connection in order to be granted access to the application service of the enterprise network 150. For example, if the application service is labelled as classified, it might be required that the subscriber entity 160 is located on-premises and/or that the subscriber entity 160 has a fixed (wired) network connection and/or that a certain type of network connection encryption is utilized for the connection between the subscriber entity 160 and the enterprise network 150.

There could be different types of connections between the ZTNA controller 200 and the UDM entity 300. In this respect, since sensitive information is passed between the ZTNA controller 200 and the UDM entity 300, there should be a trust relationship between these two entities. In some aspects it is required that there is a secure, or trusted, connection between the ZTNA controller 200 and the UDM entity 300. As an example, the trust relationship can be established by the use of trusted certificates between these two entities. One way to establish such a secure, or trusted, connection involves the exchange of encryption certificates. In particular, in some embodiments, the request is provided upon encryption certificates have been exchanged between the ZTNA controller 200 and the UDM entity 300 and a secured connection having been established between the ZTNA controller 200 and the UDM entity 300 based on the encryption certificates as exchanged. With reference back to FIG. 1, if the ZTNA controller 200 is deployed within the core network 120 or at the edge of the access network 110, the ZTNA controller 200 might be deployed and operated by a mobile network operator (MNO), then it might be easier to establish the trust than if the ZTNA controller 200 is located elsewhere. When the ZTNA controller 200 is deployed and operated by an MNO, the MNO can readily extend the trust relationship that it uses for its other core network functionalities. However, when the ZTNA controller 200 is deployed outside the domains of the MNO, such as in an external computing cloud environment that is operated by another entity, then setting up the trust relationship could be more challenging. The trust relationship can still be setup with the use of trusted certificates.

Figure 3:
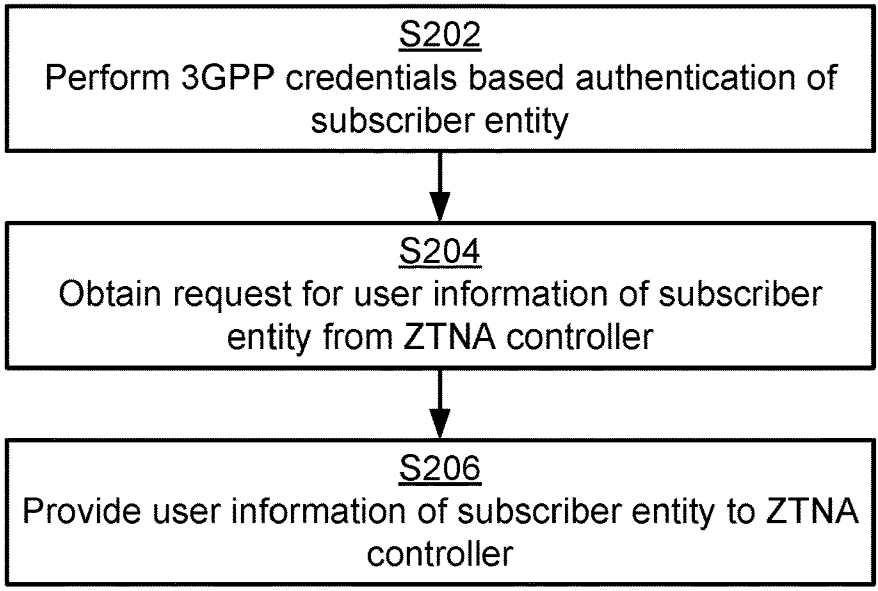

Reference is now made to FIG. 3 illustrating a method for authenticating a subscriber entity 160 as performed by the UDM entity 300 of a core network 120 according to an embodiment.

S202: The UDM entity 300 participates in 3GPP credentials based authentication of the subscriber entity 160 to an access network 110 to which the core network 120 is operatively connected.

S204: The UDM entity 300 obtains a request for user information of the subscriber entity 160 from a ZTNA controller 200. The request for user information comprises an identifier of the subscriber entity 160.

S206: The UDM entity 300 provides the user information of the subscriber entity 160 to the ZTNA controller 200. The user information indicates successful 3GPP credentials based authentication of the subscriber entity 160.

Embodiments relating to further details of authenticating a subscriber entity 160 as performed by the UDM entity 300 will now be disclosed.

As disclosed above, there could be different identifiers of the subscriber entity 160 that the ZTNA controller 200 provides in the request for user information, and hence that the UDM entity 300 obtains in step S204. As disclosed above, in some embodiments, the identifier of the subscriber entity 160 is an IP address. The UDM entity 300 might then map the IP address to a subscriber identity of the subscriber entity 160 from which the user information of the subscriber entity 160 is identified.

As follows from FIG. 1 and as will be further disclosed below, there are different places in the communication network 100 where the ZTNA controller 200 might be deployed. In some aspects, which user information of the subscriber entity 160 the UDM entity 300 provides to the ZTNA controller 200 in step S206 might depend on where in the communication network 100 the ZTNA controller 200 is deployed. In particular, in some embodiments, a highest level of detail of the user information is provided to the ZTNA controller 200 when the ZTNA controller 200 is provided either in the core network 120 or in the access network 110, and a lowest level of detail of the user information is provided to the ZTNA controller 200 when the ZTNA controller 200 is provided in the enterprise network 150.

As disclosed above, the ZTNA controller 200 might obtains further information from the UDM entity 300. Hence, in some embodiments, the user information comprises at least one parameter value pertaining to any of: location of the subscriber entity 160, type of network connection for which the 3GPP credentials based authentication was performed, device related information of the subscriber entity 160.

As disclosed above, there could be different types of connections between the ZTNA controller 200 and the UDM entity 300. In particular, in some embodiments, the request is obtained upon encryption certificates have been exchanged between the UDM entity 300 and the ZTNA controller 200 and a secured connection having been established between the UDM entity 300 and the ZTNA controller 200 based on the encryption certificates as exchanged. In further respect, what user information can be provided by the UDM entity 300 to the ZTNA controller 200 may vary depending on the deployment scenario. For example, if the ZTNA controller 200 is deployed outside the domains of a particular MNO, then the UDM entity 300 of that particular MNO might be configured not to send user information labelled as sensitive or classified due to regulatory reasons.

Figure 4:
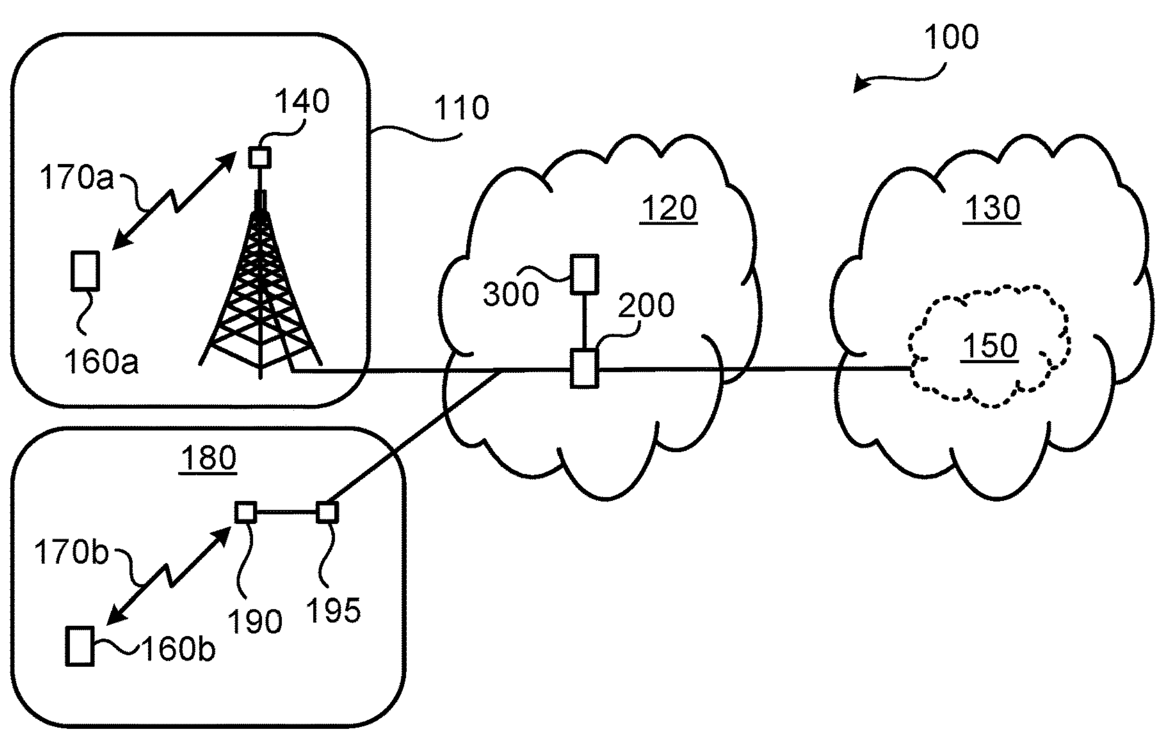
Figure 5:
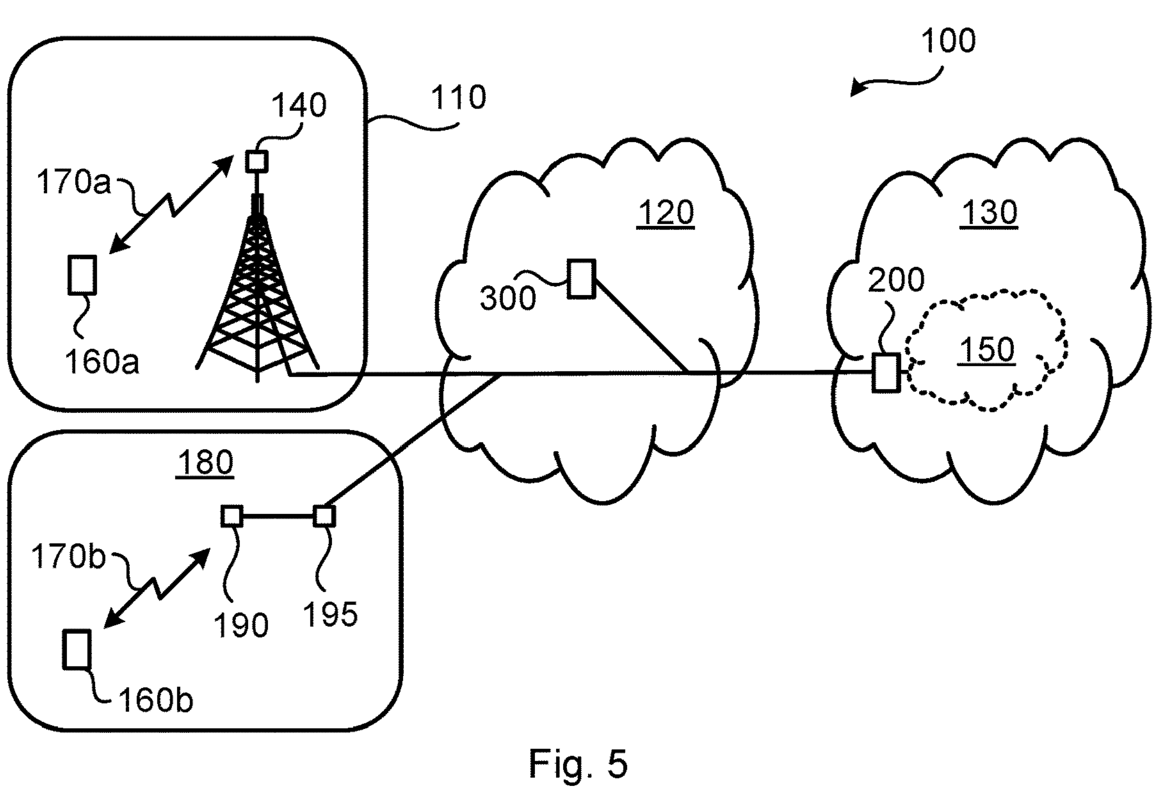
Figure 6:
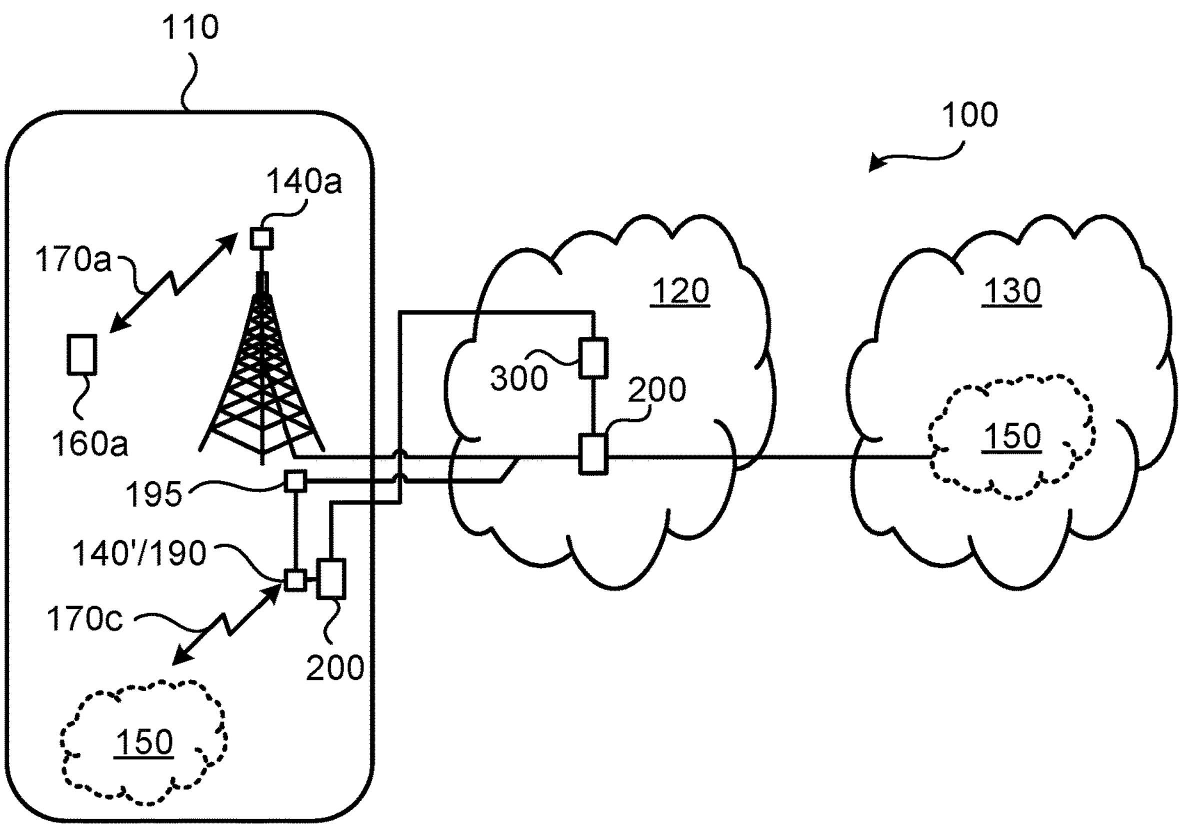

Further embodiments, aspects, and examples as applicable to both the ZTNA controller 200, the methods performed by the ZTNA controller 200, the UDM entity 300, and the methods performed by the UDM entity 300 with reference to FIGS. 4, 5, and 6 which show different deployments of the communication network 100 in FIG. 1. In principle, these deployments differ with respect to where the ZTNA controller 200 is deployed.

In the examples of FIG. 4 the ZTNA controller 200 is deployed in the core network 120. In the examples of FIG. 5 the ZTNA controller 200 is deployed in the service network 130. FIG. 5 also represent an embodiment where the ZTNA controller 200 is deployed in the enterprise network 150. In the examples of FIG. 6 the ZTNA controller 200 is deployed at the edge of access network 110. Hence, in some embodiments, the ZTNA controller 200 is provided in any of: the access network 110, the core network 120, the enterprise network 150. The deployments of the different examples of FIG. 4, FIG. 5, and FIG. 6 are combinable depending on the scenario. Thus, there might be two or more instances of the ZTNA controller 200 in the communication network 100 to cater for such different scenarios. Further, there might be one instance of the UDM entity 300 and/or one or more instance of the ZTNA controller 200 per MNO.

With particular reference to the deployments of the communication network 100 illustrated in FIG. 4, FIG. 5, and FIG. 6, the subscriber entities 160*a*, 16*ob* are operatively connected to the enterprise network 150 via the core network 120. Therefore, the subscriber entities 160*a*, 16*ob* first need to authenticate to the core network 120 before being able to access the service network 130 in which the enterprise network 150 is deployed. Hence, for a subscriber entity 160*a*, 160*b* to be able to request access to the enterprise network 150, the subscriber entity 160*a*, 16*ob* first needs to perform authentication to the core network 120. This authentication needs to be successful in order for the subscriber entity to request access, using user plane signalling, to the enterprise network 150.

There could be different ways in which the subscriber entity 160*a*, 16*ob* might attach to the access network 110.

According to a first example, the subscriber entity 160*a* has a direct cellular connection towards the access network 110 over a wireless link 170*a* via a network node 140. In this example each subscriber entity 160*a* can be identified at individual user level and the policy, as applied by the ZTNA controller 200 in step S108, can be applied per user basis. This can be useful for subscriber entities 160*a* in terms of user equipment such as mobile phones, tablet computers, etc.

According to a second example, the subscriber entity 16*ob* has a non-3GPP based connection and hence an indirect connection towards the access network 110. One example of this is where the subscriber entity 16*ob* attaches to a wireless network router 190 in a Wireless Local Area Network (WLAN) 180 and where the network router 190 has a connection towards the core network 120 via an interworking function 195. In this case, although the subscriber entity 160 is connecting over a non-cellular wireless connection, 3GPP credentials of the subscriber entity 160 still need to be used for the subscriber entity 160 to authenticate to the core network 120. Hence, also in this example each subscriber entity 160 can be identified at individual user level and the policy, as applied by the ZTNA controller 200 in step S108, can be applied per user basis. This can be useful for subscriber entities 160 in terms of notebook computers, workstation computers, security cameras, etc. that do not support any cellular wireless access standard or subscriber entities 160 that want to connect to a cellular network over a WLAN.

According to a third example, the subscriber entity 160*b* has a connection to another entity (such as a network node 140' or router 190) that is connected to the access network 110. In other words, the subscriber entity 16*ob* is not operatively connected to the access network 110. One example of this is where the subscriber entity 16*ob* attaches to a network router 190, where the subscriber entity 16*ob* has a connection to the network router 190, and where the network router 190 has a cellular connection towards the access network 110. For this example, only the network router 190 can be identified by the core network 120 and one common policy, as applied by the ZTNA controller 200 in step S108, is applied per router basis. This can be useful for subscriber entities 160 in enterprise customer-premises equipment.

In the example of FIG. 4, the ZTNA controller 200 could be collocated or chained to a User Plane Function (UPF) to receive the user plane signalling from the subscriber entity 300 before the user plane signalling reaches the enterprise network 150 in order to obtain the indication that the subscriber entity 160 requests to access the application service of the enterprise network 150, as in step S102. The ZTNA controller 200 then, via an interface to the UDR entity 300, provides a request for user information of the subscriber entity 160, as in step S102. This is true also for the example of FIG. 5 where the ZTNA controller 200 also is located to receive the user plane signalling from the subscriber entity 300 before the user plane signalling reaches the enterprise network 150.

In the example of FIG. 6, one instance of the enterprise network 150 is provided on-premises. This instance of the enterprise network 150 is connected to the core network 120 over a wireless link 170*c*, or a wired connection, via a network node 140'. One instance of the ZTNA controller 200 is therefore provided in the radio access network 110.

There could be different types of enterprise networks 150. In general terms, the enterprise network 150 provides access to network services, applications, and data. One non-limiting example is corporate office networks, where only employees, via their subscriber entities 160 are enabled to access corporate-internal network services, applications, and/or data. One non-limiting example is industrial automation systems where the enterprise network 150 is deployed in factories, process plants, or the like, where the subscriber entities 160 could be provided in robots and/or automated guided vehicles, and where the robots and/or the automated guided vehicles are controlled via the enterprise network 150. One non-limiting example is network-connected vehicles, where the subscriber entities 160 could be provided in the network-connected vehicles and the enterprise network 150 is configured for services relating to monitoring, management, entertainment, etc. A subscriber entity 160 with 3GPP credentials could thus be provided in a vehicle, such as an automotive vehicle. By means of the herein disclosed embodiments, there is no need to perform two independent authentication procedures for the subscriber entity 160 each time the subscriber entity 160 needs to access the enterprise network 150. Hence, the subscriber entity 160 does not need to be provided with separate credentials for authenticating to the enterprise network 150.

Figure 7:
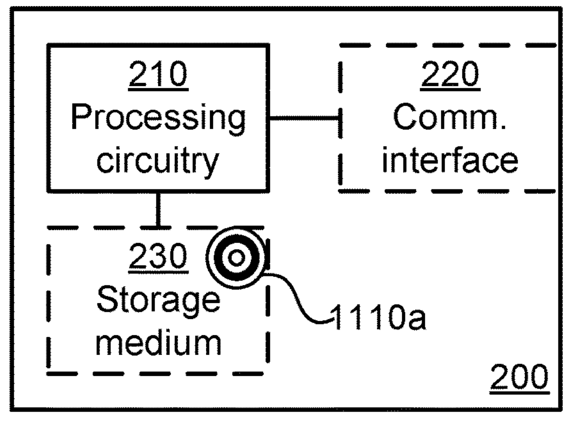
FIG. 7 is a schematic diagram showing functional units of a ZTNA controller according to an embodiment.

FIG. 7 schematically illustrates, in terms of a number of functional units, the components of a ZTNA controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the ZTNA controller 200 to perform a set of operations, or steps, as disclosed above. For example, the storage medium 230 may store the set of operations, and the processing circuitry 210 may be configured to retrieve the set of operations from the storage medium 230 to cause the ZTNA controller 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The ZTNA controller 200 may further comprise a communications interface 220 for communications with other entities, functions, nodes, and devices, for example along interfaces as shown in FIG. 1. As such the communications interface 220 may comprise one or more transmitters and receivers, comprising analogue and digital components.

The processing circuitry 210 controls the general operation of the ZTNA controller 200 e.g. by sending data and control signals to the communications interface 220 and the storage medium 230, by receiving data and reports from the communications interface 220, and by retrieving data and instructions from the storage medium 230. Other components, as well as the related functionality, of the ZTNA controller 200 are omitted in order not to obscure the concepts presented herein.

The ZTNA controller 200 may be provided as a standalone device or as a part of at least one further device. For example, the ZTNA controller 200 may be provided in a node of the radio access network or in a node of the core network or in a node of the service network 130. Alternatively, functionality of the ZTNA controller 200 may be distributed between at least two devices, or nodes. Thus, a first portion of the instructions performed by the ZTNA controller 200 may be executed in a first device, and a second portion of the instructions performed by the ZTNA controller 200 may be executed in a second device; the herein disclosed embodiments are not limited to any particular number of devices on which the instructions performed by the ZTNA controller 200 may be executed. Hence, the methods according to the herein disclosed embodiments are suitable to be performed by a ZTNA controller 200 residing in a cloud computational environment. Therefore, although a single processing circuitry 210 is illustrated in FIG. 7 the processing circuitry 210 may be distributed among a plurality of devices, or nodes. The same applies to the functional modules 210*a*:210*e* of FIG. 8 and the computer program 1120*a* of FIG. 11.

Figure 8:
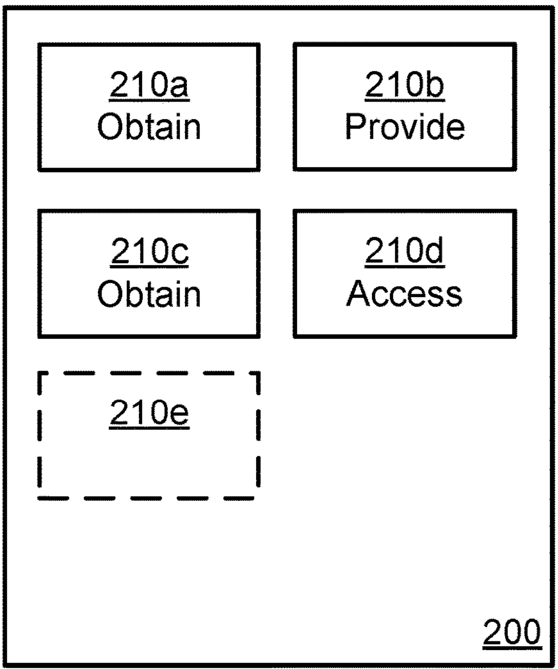
FIG. 8 is a schematic diagram showing functional modules of a ZTNA controller according to an embodiment.

FIG. 8 schematically illustrates, in terms of a number of functional modules, the components of a ZTNA controller 200 according to an embodiment. The ZTNA controller 200 of FIG. 8 comprises a number of functional modules; an obtain module 210*a* configured to perform step S102, a provide module 210*b* configured to perform step S104, an obtain module 210*c* configured to perform step S106, and an access module 210*d* configured to perform step S108. The ZTNA controller 200 of FIG. 8 may further comprise a number of optional functional modules, as represented by functional module 210*e*. In general terms, each functional module 210*a*:210*e* may be implemented in hardware or in software. Preferably, one or more or all functional modules 210*a*:210*e* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*:210*e* and to execute these instructions, thereby performing any steps of the ZTNA controller 200 as disclosed herein.

Figure 9:
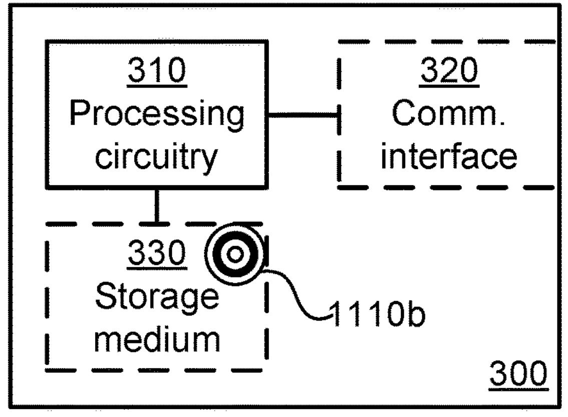
FIG. 9 is a schematic diagram showing functional units of a UDM entity according to an embodiment.

FIG. 9 schematically illustrates, in terms of a number of functional units, the components of a UDM entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the UDM entity 300 to perform a set of operations, or steps, as disclosed above. For example, the storage medium 330 may store the set of operations, and the processing circuitry 310 may be configured to retrieve the set of operations from the storage medium 330 to cause the UDM entity 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The UDM entity 300 may further comprise a communications interface 320 for communications with other entities, functions, nodes, and devices, for example along interfaces as shown in FIG. 1. As such the communications interface 320 may comprise one or more transmitters and receivers, comprising analogue and digital components.

The processing circuitry 310 controls the general operation of the UDM entity 300 e.g. by sending data and control signals to the communications interface 320 and the storage medium 330, by receiving data and reports from the communications interface 320, and by retrieving data and instructions from the storage medium 330.

Other components, as well as the related functionality, of the UDM entity 300 are omitted in order not to obscure the concepts presented herein.

Figure 10:
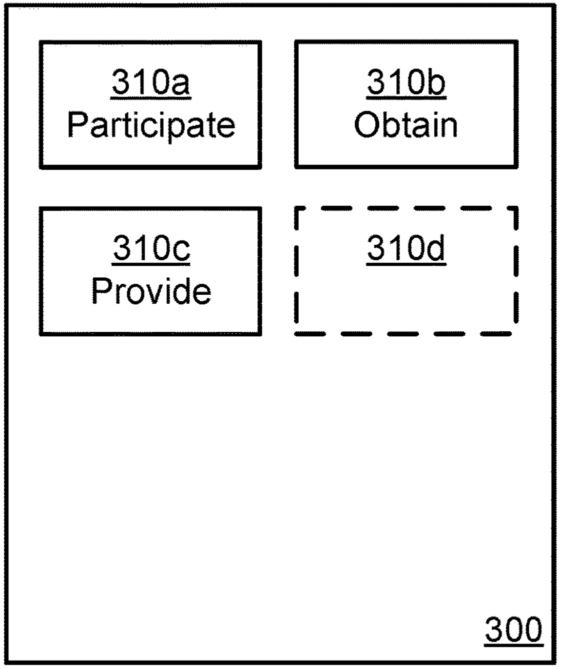
FIG. 10 is a schematic diagram showing functional modules of a UDM entity according to an embodiment.

FIG. 10 schematically illustrates, in terms of a number of functional modules, the components of a UDM entity 300 according to an embodiment. The UDM entity 300 of FIG. 10 comprises a number of functional modules; a participate module 310*a* configured to perform step S202, an obtain module 310*b* configured to perform step S304, and a provide module 310*c* configured to perform step S206. The UDM entity 300 of FIG. 10 may further comprise a number of optional functional modules, as represented by functional module 310*d*. In general terms, each functional module 310*a*:301*d* may be implemented in hardware or in software. Preferably, one or more or all functional modules 310*a*:310*d* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*:310*d* and to execute these instructions, thereby performing any steps of the UDM entity 300 as disclosed herein.

The UDM entity 300 may be provided as a standalone device or as a part of at least one further device. For example, the UDM entity 300 may be provided in a node of the core network. Alternatively, functionality of the UDM entity 300 may be distributed between at least two devices, or nodes. Thus, a first portion of the instructions performed by the UDM entity 300 may be executed in a first device, and a second portion of the instructions performed by the UDM entity 300 may be executed in a second device; the herein disclosed embodiments are not limited to any particular number of devices on which the instructions performed by the UDM entity 300 may be executed. Hence, the methods according to the herein disclosed embodiments are suitable to be performed by a UDM entity 300 residing in a cloud computational environment. Therefore, although a single processing circuitry 310 is illustrated in FIG. 9 the processing circuitry 310 may be distributed among a plurality of devices, or nodes. The same applies to the functional modules 310*a*:310*d* of FIG. 10 and the computer program 1120*b* of FIG. 11.

Figure 11:
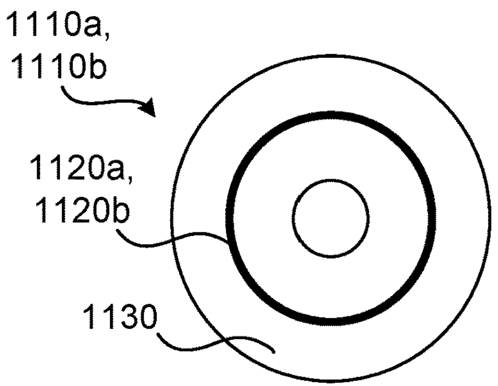
FIG. 11 shows one example of a computer program product comprising computer readable means according to an embodiment.

FIG. 11 shows one example of a computer program product 1110*a*, 1110*b* comprising computer readable means 1130. On this computer readable means 1130, a computer program 1120*a* can be stored, which computer program 1120*a* can cause the processing circuitry 210 and thereto operatively coupled entities and devices, such as the communications interface 220 and the storage medium 230, to execute methods according to embodiments described herein. The computer program 1120*a* and/or computer program product 1110*a* may thus provide means for performing any steps of the ZTNA controller 200 as herein disclosed. On this computer readable means 1130, a computer program 1120*b* can be stored, which computer program 1120*b* can cause the processing circuitry 310 and thereto operatively coupled entities and devices, such as the communications interface 320 and the storage medium 330, to execute methods according to embodiments described herein. The computer program 1120*b* and/or computer program product 1110*b* may thus provide means for performing any steps of the UDM entity 300 as herein disclosed.

In the example of FIG. 11, the computer program product 1110*a*, 1110*b* is illustrated as an optical disc, such as a CD (compact disc) or a DVD (digital versatile disc) or a Blu-Ray disc. The computer program product 1110*a*, 1110*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120*a*, 1120*b* is here schematically shown as a track on the depicted optical disk, the computer program 1120*a*, 1120*b* can be stored in any way which is suitable for the computer program product 1110*a*, 1110*b*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for controlling access of a subscriber entity to an application service of an enterprise network, the method being performed by a Zero-Trust Network Access (ZTNA) controller, the method comprising:

obtaining an indication that the subscriber entity requests to access the application service of the enterprise network, wherein the indication is obtained at the ZTNA controller in a core network via an access network to which the subscriber entity is operatively connected;

providing a request for user information of the subscriber entity to a User Data Management (UDM) entity provided in the core, wherein the request for user information comprises an identifier of the subscriber entity;

obtaining the user information of the subscriber entity from the UDM entity, wherein the user information indicates successful 3GPP credentials based authentication of the subscriber entity performed by the UDM entity; and granting access for the subscriber entity to the application service of the enterprise network only when a policy associated to the user information allows so.

2. The method of claim 1, wherein the policy defines interactions allowed to be performed by the subscriber entity with the enterprise network.

3. The method of claim 1, wherein the identifier of the subscriber entity is an Internet Protocol (IP) address.

4. The method of claim 1, wherein granting access for the subscriber entity to the application service of the enterprise network additionally is based on at least one parameter value pertaining to any of: a location of the subscriber entity, a role of the subscriber entity in the enterprise network, login credentials provided by the subscriber entity for logging on to the enterprise network, a type of network connection for the subscriber entity, a device related information of the subscriber entity.

5. The method of claim 4, wherein at least one of the at least one parameter value is obtained in the user information from the UDM entity.

6. The method of claim 4, wherein at least one of the at least one parameter value is obtained from any of: the subscriber entity, the enterprise network, information stored locally in the ZTNA controller.

7. The method of claim 4, wherein access for the subscriber entity to the application service of the enterprise network additionally only is granted when the at least one parameter value fulfils an access-limiting requirement for the application service.

8. The method of claim 1, wherein the request is provided upon encryption certificates have been exchanged between the ZTNA controller and the UDM entity and a secured connection having been established between the ZTNA controller and the UDM entity based on the encryption certificates as exchanged.

9. The method of claim 1, wherein the subscriber entity is provided in an end-user device.

10. The method of claim 1, wherein the subscriber entity is provided in a network router.

11. A Zero-Trust Network Access (ZTNA) controller for controlling access of a subscriber entity to an application service of an enterprise network, the ZTNA controller comprising:

processing circuitry and memory, the memory containing instructions executable by the processing circuitry, whereby the ZTNA controller is configured to:

obtain an indication that the subscriber entity requests to access the application service of the enterprise network, wherein the indication is obtained at the ZTNA controller in a core network via an access network to which the subscriber entity is operatively connected;

provide a request for user information of the subscriber entity to a User Data Management (UDM) entity provided in the core, wherein the request for user information comprises an identifier of the subscriber entity;

obtain the user information of the subscriber entity from the UDM entity, wherein the user information indicates successful 3GPP credentials based authentication of the subscriber entity performed by the UDM entity; and grant access for the subscriber entity to the application service of the enterprise network only when a policy associated to the user information allows so.

12. The ZTNA controller of claim 11, wherein the policy defines interactions allowed to be performed by the subscriber entity with the enterprise network.

13. The ZTNA controller of claim 11, wherein the identifier of the subscriber entity is an Internet Protocol (IP) address.

14. The ZTNA controller of claim 11, wherein the grant access for the subscriber entity to the application service of the enterprise network additionally is based on at least one parameter value pertaining to any of: a location of the subscriber entity, a role of the subscriber entity in the enterprise network, login credentials provided by the subscriber entity for logging on to the enterprise network, a type of network connection for the subscriber entity, a device related information of the subscriber entity.

15. The ZTNA controller of claim 14, wherein at least one of the at least one parameter value is obtained in the user information from the UDM entity.

16. The ZTNA controller of claim 14, wherein at least one of the at least one parameter value is obtained from any of: the subscriber entity, the enterprise network, information stored locally in the ZTNA controller.

17. The ZTNA controller of claim 14, wherein access for the subscriber entity to the application service of the enterprise network additionally only is granted when the at least one parameter value fulfils an access-limiting requirement for the application service.

18. The ZTNA controller of claim 11, wherein the request is provided upon encryption certificates have been exchanged between the ZTNA controller and the UDM entity and a secured connection having been established between the ZTNA controller and the UDM entity based on the encryption certificates as exchanged.

19. The ZTNA controller of claim 11, wherein the subscriber entity is provided in an end-user device.

20. A non-transitory computer-readable medium storing a computer program product for controlling a Zero-Trust Network Access (ZTNA) controller, the computer program product comprising software instructions that, when run on the ZTNA controller, causes the ZTNA controller to:

obtain an indication that a subscriber entity requests to access an application service of a enterprise network, wherein the indication is obtained at the ZTNA controller in a core network via an access network to which the subscriber entity is operatively connected;

provide a request for user information of the subscriber entity to a User Data Management (UDM) entity provided in the core, wherein the request for user information comprises an identifier of the subscriber entity;

obtain the user information of the subscriber entity from the UDM entity, wherein the user information indicates successful 3GPP credentials based authentication of the subscriber entity performed by the UDM entity;

grant access for the subscriber entity to the application service of the enterprise network only when a policy associated to the user information allows so; and wherein the ZTNA controller controls access of the subscriber entity to the application service of the enterprise network.

* * * * *